May 8, 1962 K. STOLL 3,033,555
TORSION MEANS SPRING DEVICE
Filed June 16, 1954 2 Sheets-Sheet 1

Inventor:
KARL STOLL
by his Attorneys
Howson and Howson

May 8, 1962 K. STOLL 3,033,555
TORSION MEANS SPRING DEVICE
Filed June 16, 1954 2 Sheets-Sheet 2
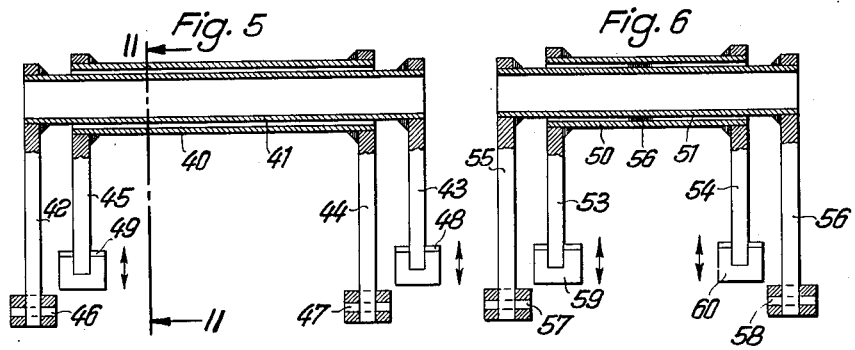
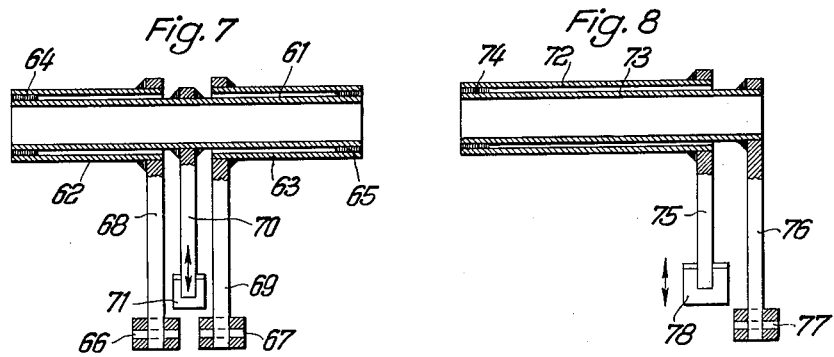
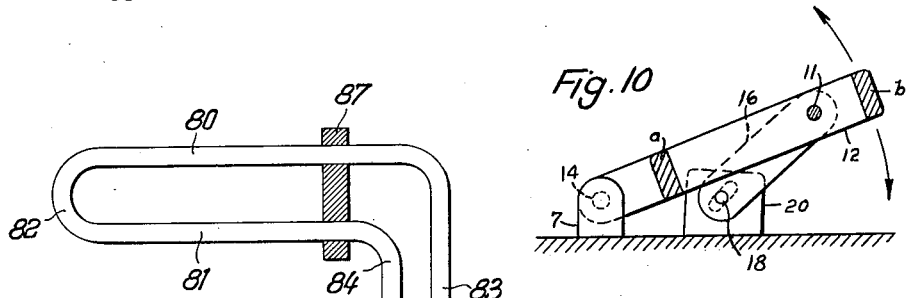
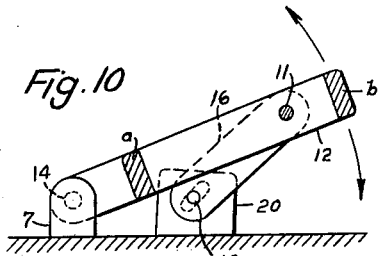
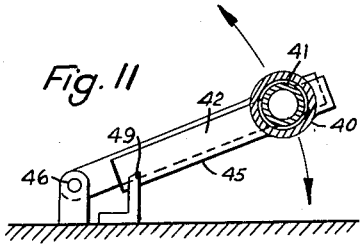
Inventor:
KARL STOLL
by his Attorneys
Howson and Howson

United States Patent Office 3,033,555
Patented May 8, 1962

3,033,555
TORSION MEANS SPRING DEVICE
Karl Stoll, Dusseldorf, Germany, assignor, by decree of distribution, of one-half to Gerda Rosalie Louise Stoll and one-half to Friedrich Karl Stoll, both of Dusseldorf, Germany
Filed June 16, 1954, Ser. No. 437,228
Claims priority, application Germany June 18, 1953
10 Claims. (Cl. 267—57)

The invention relates to a torsion bar spring suspension and has for its object to improve the suspension properties and to enlarge the possibilities of use by means of a novel construction.

In the known torsion bar spring suspensions, as a rule, the torsion bar is rigidly secured on one end, while the other end is equipped with a lever arm on which the force to be absorbed by the torsion bar acts. The length and the cross section of the torsion bar determine its permissible torsion angle and, thereby, a fixed disposal of the moment of force dependent on the angular travel of the lever arm. The angular travel of the lever arm, i.e., the spring deflection, is identical with the torsion angle of the torsion bar.

According to the present invention, there act on the torsion bar at least two levers of different length which, in a turning movement of the torsion bar in relation to an approximately parallel axle, carry out different angular travels. In this connection, the difference in the angular travels of the levers of different length which act on the torsion bar determines the torsion angle of the torsion bar. This difference in the angular travels of the levers is dependent on the relation of the lengths of the lever arms. Therefore, with a given length and a given cross section of the torsion bar, independent of the permissible torsion angle of the torsion bar, it is possible, by a corresponding selection of the length relation of the levers, to receive a spring deflection which is greater than the torsion angle of the torsion bar. The spring deflection is the greater the smaller the difference in length of the levers.

The lever arms of different length which are rigidly connected to the torsion bar may themselves serve as pivoted levers for the said bar. The simplest constructional form consists of the torsion bar being pivotally connected to its abutments by means of two lever arms which are rigidly connected to the bar. In this case, however, due to the different angular paths of the lever arms, there are produced an inclined position of the torsion bar and undesirable maximum torques in the pivots of the lever arms. It is more expedient to provide the torsion bar with at least two lever arms of the same length and at least one additional lever of different length. The torsion bar may also be rotatably mounted in the free end of a rocking lever which is provided in addition to the lever arms of different length, or in the free ends of a plurality of additional rocking levers of the same lengths, it being possible for the additional rocking lever to be rigidly connected to a lever arm of length equal to that of the torsion bar or for the additional rocking levers to be rigidly connected to one another. In such a case the supporting ends or connecting pivot pins of the lever arms rigidly connected to the torsion bar are displaceably mounted.

One particular constructional form of the invention consists in that the torsion bar has at least two lever arms of equal length and at least one additional arm of different length.

Another constructional form of the invention is one in which the torsion means consists of at least two torsion bars arranged concentrically one within the other or parallel to one another for rocking movement about an axis which is parallel or substantially parallel to said bars. Each of the said torsion bars carries at least one lever arm serving for its support, as well as a supporting lever arm of the concentric or parallel torsion bar, which latter arm differs in length from the first-mentioned lever arm. Where, in this specification and in the subjoined claims, reference is made to a "torsion means" or a "torsion element," these terms are employed to refer to either a torsion bar or bars or torsion tubes.

It is possible to provide various constructional forms on this basis. For example, the torsion bars arranged concentrically one within the other or parallel to one another may be rigidly interconnected at one end, and have lever arms of different length at their free ends.

Another possible constructional form consists of each of two torsion bars rotatably mounted one within the other or adjacent one another carrying two lever arms of different length at its ends, the shorter lever arm of one torsion bar having adjacent to it the longer lever arm of the other torsion bar, and vice versa. However, this produces an unsymmetrical arrangement of the lever arms of different lengths. In the event that the lever arms must be symmetrically arranged, the two torsion bars arranged one within the other or parallel to one another may be rigidly interconnected substantially at the middle of their length and two lever arms of equal length may be arranged on the ends of each torsion bar, it being necessary for the length of the lever arms of one torsion bar to be different from the length of the lever arms of the other torsion bar.

In another constructional form of the invention, one torsion bar has rigidly connected thereto two shorter parallel or concentric torsion bars at their ends which are remote from one another, those ends of the shorter torsion bars which face one another carrying two equally long lever arms in a symmetrical arrangement to a lever arm of the longer torsion bar, which arm differs in length. With this constructional form, all the lever arms are brought together in the region of the middle of the longer torsion bar, so that a structure which is substantially T-shaped in plan view is obtained, which structure may be advantageous for certain uses.

Yet another construction of the invention consists of the supporting bearings of the lever arms being in part or all adjustable in relation to the axis or axes of the torsion bar or bars. In this way it is possible by simple means to vary the characteristic of the suspension system, that is to say to adapt the hardness of the suspension to the load at the time.

Numerous possible uses are provided for the novel torsion bar suspension system. The torsion bar suspension system may be used with particular advantage for the suspension of vehicles by the torsion bar or bars, or the lever arms connected thereto, serving as supports for the wheel axles. The wheel axles may be arranged concentrically of, parallel to or at right-angles to the torsion bar or bars. In certain cases, the torsion bar may also itself serve as a wheel axle.

The torsion bar suspension sysem may also be considered in respect of furniture for sitting and reclining purposes, for example, for the suspension of the sitting or reclining surface, as a resilient back-rest, for folding seats and the like.

The novel torsion bar suspension system may also be used for fender purposes in harbour installations, for example, for dolphins or for mooring piles on pier walls. One form of use consists, for example, in a steel tube or the like serving as a torsion bar spring being connected in a vertical or substantially vertical position.

Constructional forms are illustrated diagrammatically by way of example in FIGURES 1 to 11 of the drawing.

FIGS. 5 to 8 inclusive are views in longitudinal section through embodiments of my invention in which there are two or more torsion bar parts, one mounted axially parallel to the other and with a long lever arm of one part of the bar adjacent the shorter lever of another part. FIG. 5 shows two steel tubes rotatably arranged one inside the other, with the short levers on one tube and the long levers on the other. In FIG. 6 concentric torsion tubes are shown rigidly interconnected at their midpoints. In FIG. 7 I have shown a long inner tube connected rigidly at its end to two shorter tubes concentric therewith, there being a short lever at the midpoint of the long arm and a longer lever on each short tube adjacent the lever on the long tube. In FIG. 8 the two concentric tubes are connected at one end and the levers are located at the free ends.

FIG. 9 is a diagram similar to FIG. 8 in which the torsion bar is in two parts parallel to each other.

Figure 1:
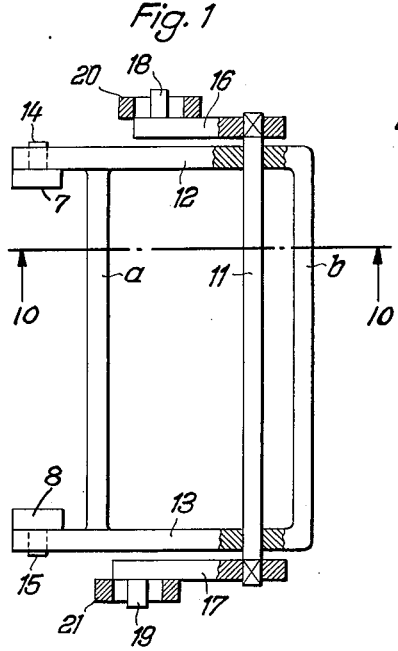
FIG. 1 is a diagrammatic view in plan of a bar spring suspension according to my invention in which the torsion bar 11 has two lever arms of equal length and two additional arms of different lengths.

FIG. 10 is a diagrammatic sectional view taken on the line 10—10 of FIG. 1 and illustrating the arrangement of lever arms in the form of the invention shown in FIG. 1.

FIG. 11 is a diagrammatic sectional view taken on the line 11—11 of FIG. 5 and illustrating the arrangement of lever arms in the form of the invention shown in FIG. 5.

In the example according to FIGS. 1 and 10, the torsion bar 11 is rotatably mounted in two parallel pivoted levers 12 and 13, which may be rigidly interconnected by transverse bars *a* and *b* or in any other manner, and the pivot axes 14 and 15 of which are coaxially arranged on abutments 7 and 8, respectively, fixedly mounted on a supporting structure which may be a part of a wheeled vehicle, a part of a piece of furniture, a mooring pile on a pier wall, etc. Rigidly connected to the ends of the torsion bar 11 are the lever arms 16 and 17 of different length, the connecting pivot pins 18 and 19 of said arms being displaceable in the bearings 20 and 21, respectively. The connecting pivot pins 14 and 15 may also be carried by the bearing members 20 and 21. The torsion bar 11 may be prolonged at both ends beyond the lever arms 16 and 17. It is possible for vehicle wheels to be mounted on the extended ends. Instead of this arrangement, that part of the torsion bar which is disposed between the pivoted levers 12 and 13 may also serve for the mounting of a vehicle wheel. In this case, it is necessary to omit the cross-member.

Figure 2:
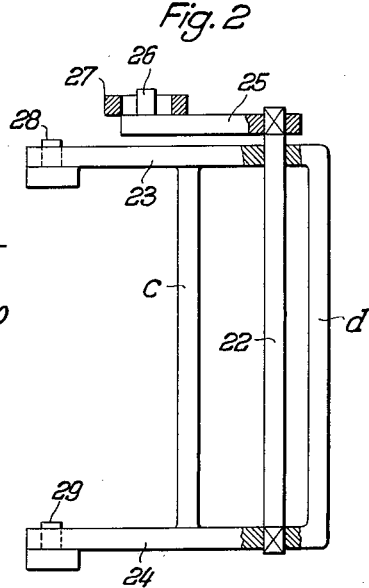
FIG. 2 is a similar view of a simplified form of the system of FIG. 1 in which there is only one additional arm, the opposite end of the torsion bar being fast in the adjacent lever arm of equal length.

FIGURE 2 shows a simplified development of the example according to FIGURE 1. According to FIGURE 2, the torsion bar 22 is rotatably mounted in the free end of only one pivoted lever 23 and is rigidly connected at the other end of the second pivoted lever 24. The lever arm 25 is rigidly connected to that end of the torsion bar 22 which is rotatably mounted in the pivoted lever 23. The connecting pivot pin 26 of this lever arm slides in the bearing 27. The connecting pivots 28 and 29 of the pivoted levers 23 and 24 respectively are coaxially arranged. The pivoted levers 23 and 24 may also be rigidly interconnected by one or more transverse bars *c* and *d*.

Figure 3:
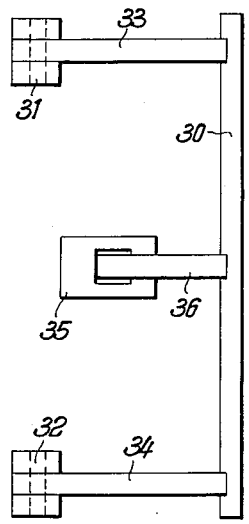
FIGS. 3 and 4 are diagrammatic and perspective views, respectively, of an embodiment of my invention having a lever arm of equal length in the region of each torsion bar end and a shorter lever at the midpoint, FIG. 4 showing the system used for the suspension of a wheeled vehicle.

Referring to the constructional example shown in FIGURE 3, the torsion bar 30 is provided in the region of its ends with two lever arms 33 and 34 which are of equal length and adapted to pivot about the pivot pins 31 and 32. In addition, at the middle of the torsion bar 30 there is a third shorter lever arm 36 which is displaceably supported at 35. A force acting at right-angles on the torsion bar 30 causes a rocking movement of the said bar about the pins 31 and 32, the sections of the torsion bar between the shorter lever arm 36 on the one hand and the longer lever arms 33 and 34 on the other hand being subjected to oppositely directed torsional stresses.

Figure 4:
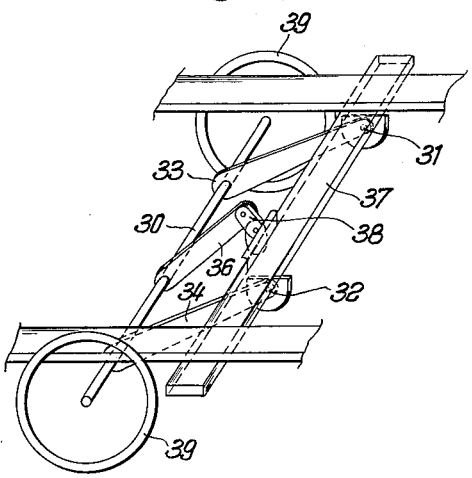

FIGURE 4 is a perspective view showing the use of the example according to FIGURE 3 for the suspension of a vehicle. The lever arms 33 and 34 of the torsion bar 30 are connected by means of the connecting pivot pins 31 and 32 to a transverse bearer 37 of the vehicle frame. The shorter lever arm 36 is connected by means of a link 38 to the transverse bearer 37 of the vehicle frame. The vehicle wheels 39 are mounted on the ends of the torsion bar 30 which project beyond the levers 33 and 34.

In the example according to FIGURE 5, two steel tubes 40 and 41 acting as torsion bars are concentrically and rotatably arranged one within the other. Each of the two steel tubes is provided at each end with a lever arm 42, 43 and 44, 45 respectively, which are of different lengths, the arrangement being such that the shorter lever arm of one of the steel tubes is adjacent the longer lever arm of the other steel tube. The longer lever arms 42 and 44 are adapted to rock about the coaxial pivots 46 and 47, while the shorter lever arms 43 and 45 are flexibly or displaceably supported on bearings such as abutments 48 and 49 (see FIG. 11), which may be adjustable in the directions of the arrow *x* for the purpose of varying the characteristic of the suspension. The outer torsion bar 40 may serve as a wheel axle or as a support for a wheel axle. It is also possible for the wheel axles instead to be fitted into the ends of the inner torsion bar.

According to FIGURE 6, two steel tubes 50 and 51 acting as torsion bars are arranged concentrically one within the other and are rigidly interconnected at the middle of their length at 52. Each of the two steel tubes carries at its ends two lever arms 53, 54 and 55, 56 respectively which are of the same lengths on any one tube. The lever arms 53 and 54 of the outer steel tube 50 are shorter than the lever arms 55 and 56 of the inner steel tube. The longer lever arms 55 and 56 are adapted to pivot about the coaxial pivot pins 52 and 58, while the shorter lever arms 53 and 54 are flexibly or displaceably supported against the abutments 59 and 60, which may be adjustable in the directions, of the arrow *x* for varying the characteristic of suspension. The outer steel tube 50 may serve as a wheel axle or as a support for a wheel axle, but it is also possible for the wheel axles to be fitted into the ends of the inner steel tube 55.

Referring to the example according to FIGURE 7, two shorter external steel tubes 62 and 63 are rigidly connected to an inner steel tube 61 at 64 and 65, i.e. at those ends of the outer tubes which are remote from one another. Those ends of the outer steel tubes 62 and 63 which face one another carry lever arms 68 and 69 which are of the same length and which are oscillatable about the coaxial pivots 66 and 67. Arranged on the inner steel tube 61 symmetrically between the said two lever arms 68 and 69 is a shorter lever arm 70. This shorter lever arm 70 is flexibly or displaceably supported against an abutment 71 which is adjustable in the directions of the arrow *x*. The outer steel tubes 62 and 63 may serve as wheel axles or as supports for wheel axles, or the wheel axles may be fitted into the ends of the inner steel tube.

In FIGURE 8, two steel tubes 72 and 73 arranged concentrically one within the other are rigidly interconnected at one end at 74 and are each provided at the free ends with a lever arm 75 or 76. These lever arms 75 and 76 are different in length. The longer lever arm 76 is oscillatable about the pivot 77, while the shorter lever arm 75 is supported in a displaceable or flexible manner against an abutment which is adjustable in the directions of the arrow x. The outer steel tube 72 may serve as a wheel axle or as a support for a wheel axle, or a wheel axle may be fitted into the free end of the inner steel tube 73.

With the constructional examples illustrated in FIGURES 5 to 8, the torsion element comprises two torsion bars arranged concentrically one within the other. While retaining the arrangement of the lever arms, it is also readily possible for the torsion element to be two torsion bars which are parallel or substantially parallel to one another, for example, the torsion element may be a U-shaped member such as shown in FIG. 9 of the accompanying drawings, rather than being concentrically arranged as in FIGS. 5 to 8. A constructional form analagous to the example according to FIGURE 8 and having two parallel torsion bars is shown in FIGURE 9. In this case, two parallel torsion bars 80 and 81 are rigidly interconnected at one end at 82 and are provided at the other end with the lever arms 83 and 84, respectively. The torsion bars 80 and 81, the connecting part 82 and the lever arms 83 and 84 may all be bent out of one bar. The lever arms 83 and 84 are preferably arranged at right-angles to the position shown, that is to say, perpendicularly of the common plane of the torsion bars 80 and 81. The longer lever arm 83 of the torsion bar 80 is adapted to rock about the fixed pivot 85, while the shorter lever arm 84 of the torsion bar 81 is flexibly or displaceably supported against the abutment 86 which is adjustable in the directions of the arrow x. In order to prevent the torsion bars from taking up an inclined position relatively to one another under load, it is advisable to provide a bearing member 87 which is movable up and down with the torsion bars and in which the said bars are turnably mounted.

I claim:

1. A torsion means spring device comprising a torsion element adapted in response to spring deflection to swing about an axis substantially parallel to it, in combination with a support for said device, fixed bearings mounted on said support, and at least two supporting levers of different lengths angularly displaced from each other upon deflection of the torsion element and each rigidly attached at one end to the torsion element, said levers extending in substantially parallel planes and in the same general direction from the torsion element, the longer of said levers having its end opposite the end attached to said torsion element pivotally attached to one of said fixed bearings and the shorter of said levers having its end opposite the end attached to said torsion element slidable with respect to another of said fixed bearings, the lengths of said levers differing so little from one another that the angle of swing of said torsion element is greater than the torsion angle of the torsion element due to the difference in angular travel of the levers.

2. A torsion bar spring device according to claim 1 wherein the torsion element has two parts of unequal length arranged on substantially the same axis, each part having at least one lever thereon for swinging support and a shorter lever for torsion, said two levers being spaced apart.

3. A torsion means spring device according to claim 1 in which the torsion means are tubular with two coaxial short parts and a longer part concentric with the two short parts, the two short parts being rigidly connected at their ends remote from one another to the longer part, there being two levers of one length, one on each short part at the end where the short parts adjoin, these levers being of equal length, and the lever of different length being therebetween and on the longer part.

4. A torsion means spring device according to claim 1 in which the torsion element comprises two parts with parallel axes rigidly connected at one end and having levers of different lengths at their free ends.

5. A torsion means spring device according to claim 1 in which the torsion element is substantially U-shaped, and one end of each supporting lever is connected to one of the free ends of said U-shaped element.

6. A torsion means spring device comprising a torsion bar, in combination with pivoted levers of substantially equal length supporting the torsion bar to swing about an axis substantially parallel to it in response to spring deflection, one end of each of said levers being attached to said torsion bar, a support for said device, and at least one additional lever of shorter length than said first-mentioned levers rigidly attached at one end to said torsion bar and angularly displaced with respect to said first-mentioned levers, fixed bearings for the device mounted on said support, the ends of the first-mentioned levers not attached to said torsion bar being pivotally attached to certain of said fixed bearings and the shorter of said levers having the end opposite the end attached to said torsion bar slidable with respect to one of said fixed bearings, there being at least two of said levers differing so little in length from each other that the angle of swing of the bar is greater than the torsion angle of the torsion bar due to the difference in angular travel of the levers, all of said levers extending in substantially parallel planes in the same general direction from said torsion bar.

7. A torsion means spring device according to claim 6 in which there are at least two supporting levers of one of said different lengths and they are rigidly interconnected to provide a swing mounting for the torsion bar.

8. A wheeled vehicle chassis having a torsion means spring suspension system comprising a torsion element adapted in response to spring deflection to swing about an axis substantially parallel to it, said torsion element serving as a wheel axle for the vehicle, and a wheel mounted on each end of said axle, in combination with bearings fixed to the vehicle chassis, and at least two supporting levers of different lengths angularly displaced from one another and each rigidly attached at one end to the torsion element, said levers extending in substantially parallel planes and in the same general direction from said torsion element, the longer of said levers having its end opposite that end attached to said torsion element pivotally attached to one of said fixed bearings and the shorter of said levers having its end opposite that attached to said torsion element slidable with respect to another of said fixed bearings, the lengths of said levers differing so little from one another that the angle of swing of the torsion element is greater than the torsion angle thereof due to the differences in angular travel of the levers.

9. A torsion means spring device including a torsion element swingable about an axis parallel to the length of said element; at least two levers of different length angularly displaced from each other upon deflection of the torsion element and extending in the same general direction from the torsion element, one end of each lever being rigidly connected to said torsion element; in combination with a fixed support for said device; and fixed bearings mounted on said support, the longer of said levers having its end opposite the end attached to said torsion element pivotally attached to one of said fixed bearings and the shorter of said levers having its end opposite the end attached to said torsion element slidable with respect to another of said fixed bearings, the difference in length of the two levers being so selected that the torsion angle of the torsion element is smaller than the deflection of said element when it oscillates.

10. A torsion means spring device as defined in claim 9 wherein said levers are disposed in substantially parallel planes.

References Cited in the file of this patent

UNITED STATES PATENTS

| | | |
|---|---|---|
| 118,452 | Hershey | Aug. 29, 1871 |
| 199,810 | Evans et al. | Jan. 29, 1878 |
| 365,009 | King et al. | June 14, 1887 |
| 408,519 | Powers | Aug. 6, 1889 |
| 2,103,590 | Lefevre | Dec. 28, 1937 |

FOREIGN PATENTS

| | | |
|---|---|---|
| 882,242 | France | Feb. 22, 1943 |
| 52,759 | France | June 12, 1944 |
| | (1st addition to Number 891,335) | |
| 924,210 | France | Mar. 3, 1947 |
| 1,030,977 | France | Mar. 18, 1953 |